F. SCHLABS.
DISH CLEANER.
APPLICATION FILED JUNE 1, 1909.

947,460.

Patented Jan. 25, 1910.

Witnesses:

Inventor:
Franz Schlabs
by

UNITED STATES PATENT OFFICE.

FRANZ SCHLABS, OF MAGDEBURG, GERMANY, ASSIGNOR TO KARL SCHLABS, OF MAGDEBURG, GERMANY, AND ALBERT LOBURG, OF MAGDEBURG-SALZQUELLE, GERMANY.

DISH-CLEANER.

947,400.  Specification of Letters Patent.  Patented Jan. 25, 1910.

Application filed June 1, 1909. Serial No. 400,430.

*To all whom it may concern:*

Be it known that I, FRANZ SCHLABS, a subject of the King of Prussia, German Emperor, residing at Magdeburg, Germany, have invented certain new and useful Improvements in Dish-Cleaners, of which the following is a specification.

This invention relates to an apparatus which is destined for the mechanical washing of a great number of plates, dishes, cups, saucers and the like at the same time and in such a manner that they are effectually cleaned.

The breaking and smashing of plates and dishes is greatly reduced by the use of this apparatus.

According to this invention the plates and dishes are immersed in a solution which dissolves the fat and other deposits on the plates and dishes to be washed and removes said substances from the same owing to the oscillatory motion which is imparted to the basket which contains the plates.

Figure 1:
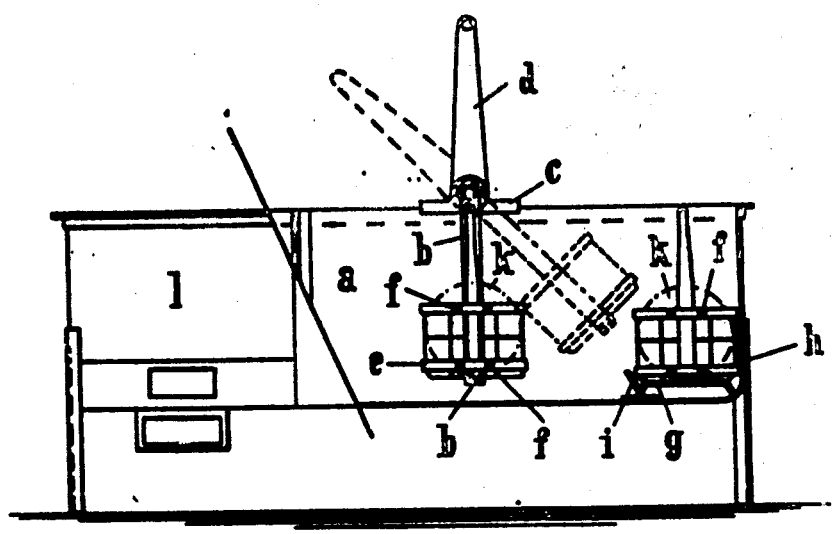
Figure 2:
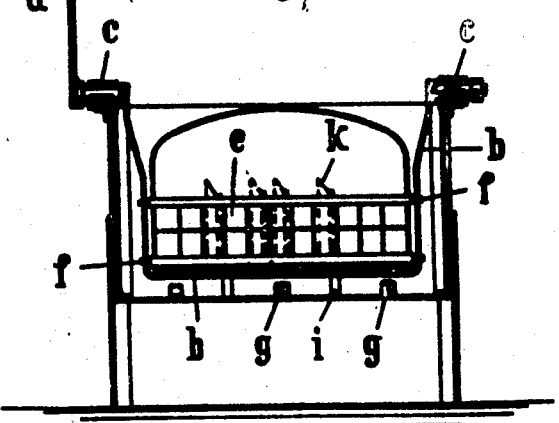

In the accompanying drawings the apparatus is shown by way of example in Figure 1 in longitudinal section and in Fig. 2 in cross section.

The apparatus consists of a tank $a$ which is to be filled with a solution possessing dissolving qualities such as a solution of soda, soap-water or the like, and in which a yoke $b$ is suspended so that it can be oscillated in fixed bearings $c$ by means of a handle $d$, crank handle, lever or the like. The plates, dishes and other objects to be washed, are placed in basket $e$ of suitable material, which is placed in the yoke $b$ and secured in its position by means of lateral arms $f$ fixed on the small sides of the basket to embrace the rods which form said yoke. Upon the bottom plate of tank $a$ a grate $g$ is arranged which serves as support for a second basket $h$ of the same construction as basket $e$, shackles $i$ or other suitable devices being arranged for maintaining said basket upon the grate. The baskets $e$, $h$ have handles of convenient construction. An auxiliary tank $l$ is provided in connection with the washing apparatus and filled with clear water.

The apparatus is used in the following manner:—The plates, dishes, &c., are placed in the baskets so that preferably they are somewhat apart the one from the others whereupon one basket ($e$) is placed in the yoke $b$ a second basket ($h$) being placed upon the grate $g$. The tank $a$ is filled with soap-water or other suitable solution. If now the yoke $b$ is oscillated in its bearings the liquid contained in tank $a$ will dissolve and wash off the plates contained in basket $e$ any fat or other deposits adhering to the same, the heavy substances collecting upon the bottom of the tank $a$. The slight movement of the liquid in tank $a$ is sufficient to previously clean the plates and other objects contained in the second basket $h$. After the plates and other objects in basket $e$ have been well cleaned, said basket is taken out of the yoke $b$ and plunged into the water tank $l$, the second basket $h$ being then placed into the yoke. Owing to the fact that the liquid in tank $a$ is comparatively agitated very little only, the heavy substances washed off the plates settle upon the bottom of the tank.

I claim:—

A mechanical dish cleaner comprising in combination, a tank, a yoke pivotally hung in said tank so that it can be easily oscillated, a dish basket, arms on said basket adapted to embrace the arms of the yoke and means for oscillating the yoke, substantially as described and shown and for the purpose set forth.

In witness whereof I have hereunto set my hand in the presence of two witnesses.

FRANZ SCHLABS.

Witnesses:
 MAX LOBURG,
 ERICH PETERS.